May 28, 1968  W. C. RAYMOND ET AL  3,385,255
VEHICLE DRIVE SYSTEM
Filed May 10, 1966  3 Sheets-Sheet 1
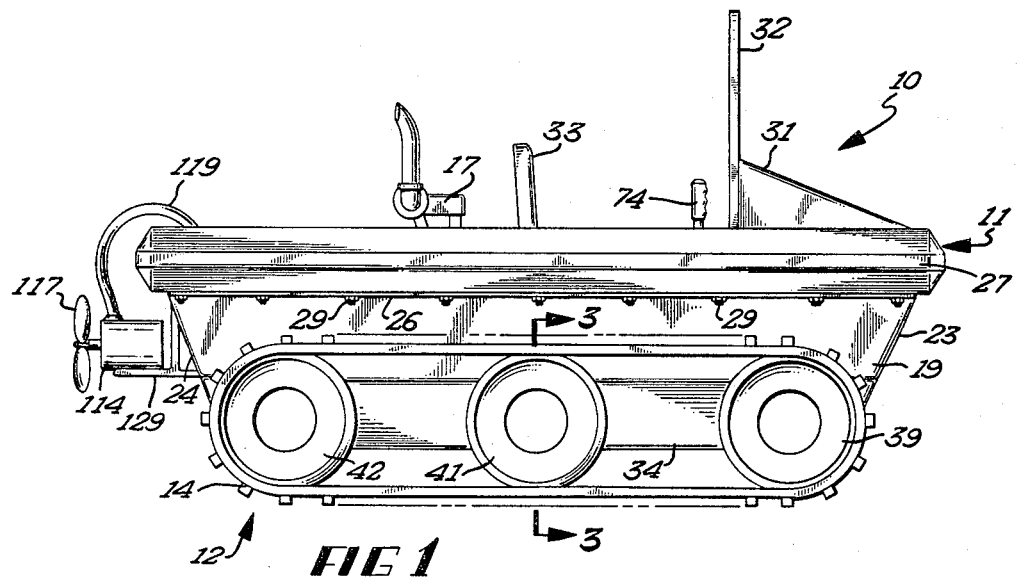
FIG 1
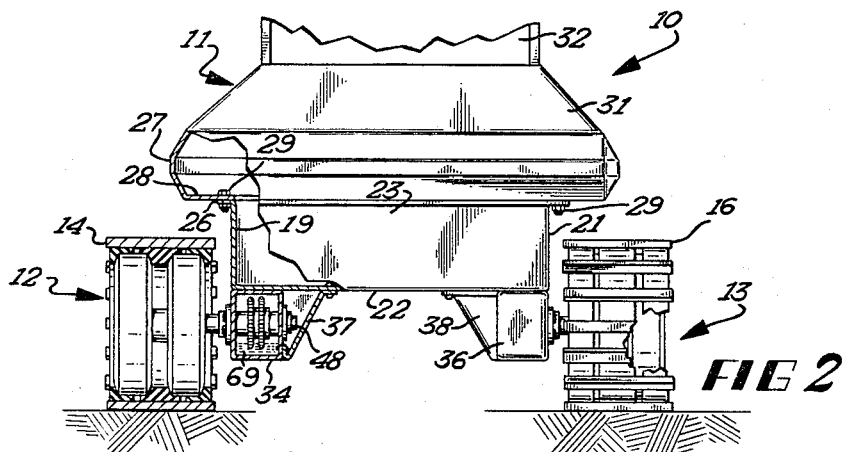
FIG 2
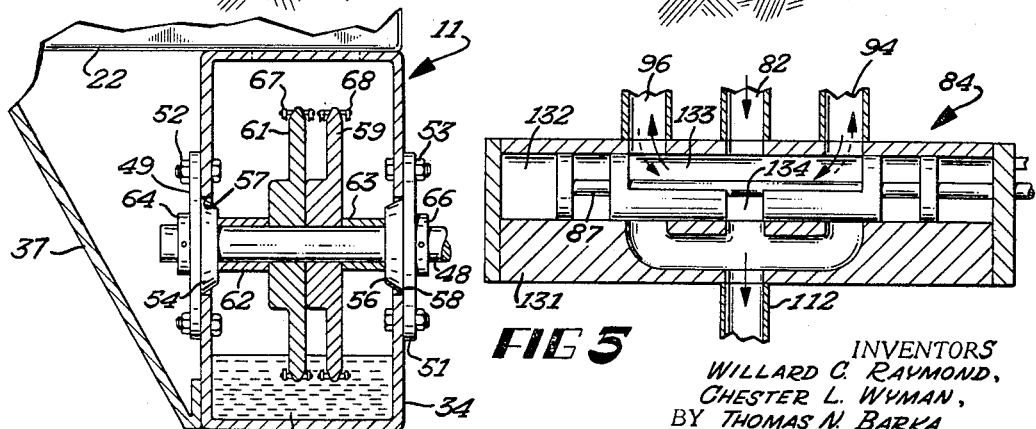
FIG 3
FIG 5
INVENTORS
WILLARD C. RAYMOND,
CHESTER L. WYMAN,
BY THOMAS N. BARKA
Braddock & Burd
ATTORNEYS May 28, 1968 W. C. RAYMOND ET AL 3,385,255
VEHICLE DRIVE SYSTEM
Filed May 10, 1966 3 Sheets-Sheet 2

INVENTORS
WILLARD C. RAYMOND,
CHESTER L. WYMAN,
THOMAS N. BARKA
BY
Braddock & Burd
ATTORNEYS INVENTORS
WILLARD C. RAYMOND,
CHESTER L. WYMAN,
THOMAS N. BARKA
BY
Braddock & Burd
ATTORNEYS United States Patent Office 3,385,255
Patented May 28, 1968

3,385,255
VEHICLE DRIVE SYSTEM
Willard C. Raymond, Edina, Chester L. Wyman, Bloomington, and Thomas N. Barka, Minneapolis, Minn., assignors, by mesne assignments, to Thomas N. Barka and David A. Berdahl
Filed May 10, 1966, Ser. No. 549,022
15 Claims. (Cl. 115—1)

ABSTRACT OF THE DISCLOSURE

A track type amphibious vehicle having a floatable body and six wheels carrying endless tracks. All the wheels are driven by a hydraulic drive system having an internal combustion engine driving a positive displacement pump with a control to vary the discharge volume of the pump. Separate valves are used to couple the outlet of the pump to separate positive displacement fluid motors operable to drive all the wheels on opposite sides of the vehicle. Each valve has a movable valving member selectively movable to forward, reverse and neutral positions to direct fluid to the motors or allow the fluid to freely flow in loops through the motors.

This invention relates to a power transmitting structure for a motor vehicle. More particularly, the invention relates to a hydraulic drive system for selectively changing the direction of or terminating the torque applied to opposite drive wheels of a motor vehicle and a wheel support and power transmitting means for the drive wheels of a vehicle.

Briefly described, the vehicle of this invention has drive wheels mounted on opposite sides of a body carrying an engine. A hydraulic system couples the engine to separate drive motors used to rotate drive wheels located on opposite sides of the body. The drive wheels are secured to axles rotatably mounted on elongated longitudinal box members forming part of the bottom portion of the body. The drive motors for the drive wheels are coupled to the axles of the respective drive wheels by power transmitting means located within the longitudinal box members. The longitudinal box members reinforce the body and provide a simple, compact and efficient support of the drive wheel axles as well as a housing and lubricating chamber for the power transmitting means drivably coupling the axles to the drive motors.

The hydraulic system has a pump means drivably connected to the engine, as an internal combustion engine. The pump means is connected by a conduit in fluid communication with a reservoir means and on operation withdraws fluid from the reservoir means and discharges a supply of fluid under pressure into a conduit leading to control valves. A pair of conduits connects each valve with one of the motors to complete separate fluid circuits to the motors. A return conduit connected to the control valves directs fluid back to the reservoir. Each control valve has a valving member selectively movable to a neutral position wherein fluid flows through the valve and back through the reservoir without trapping fluid in the fluid circuits of the motors. This prevents hydraulic braking of the drive wheels by allowing fluid to freely flow through the motors. The valving members are also movable to either forward positions or reverse positions to direct fluid under pressure to flow through the motors in opposite directions whereby the drive wheels may be simultaneously or selectively driven in a forward direction or a reverse direction. Each valving member is selectively controlled enabling the vehicle to be turned by either changing flow rate of fluid to one of the motors, terminating the flow of fluid to one of the motors, or reversing the flow of fluid to one of the motors.

In the drawings:

FIGURE 1 is a side elevational view of a track type vehicle having the drive system of this invention;

FIGURE 2 is a front elevational view partly in section of the vehicle of FIGURE 1 showing a drive wheel axle support;

FIGURE 3 is an enlarged sectional view taken along the line 3—3 of FIGURE 1 showing a drive wheel axle support;

FIGURE 5 is an enlarged sectional view of one of the control valves of the hydraulic drive system of FIGURE 4 showing the movable valving member in the neutral flow position;

Figure 4:
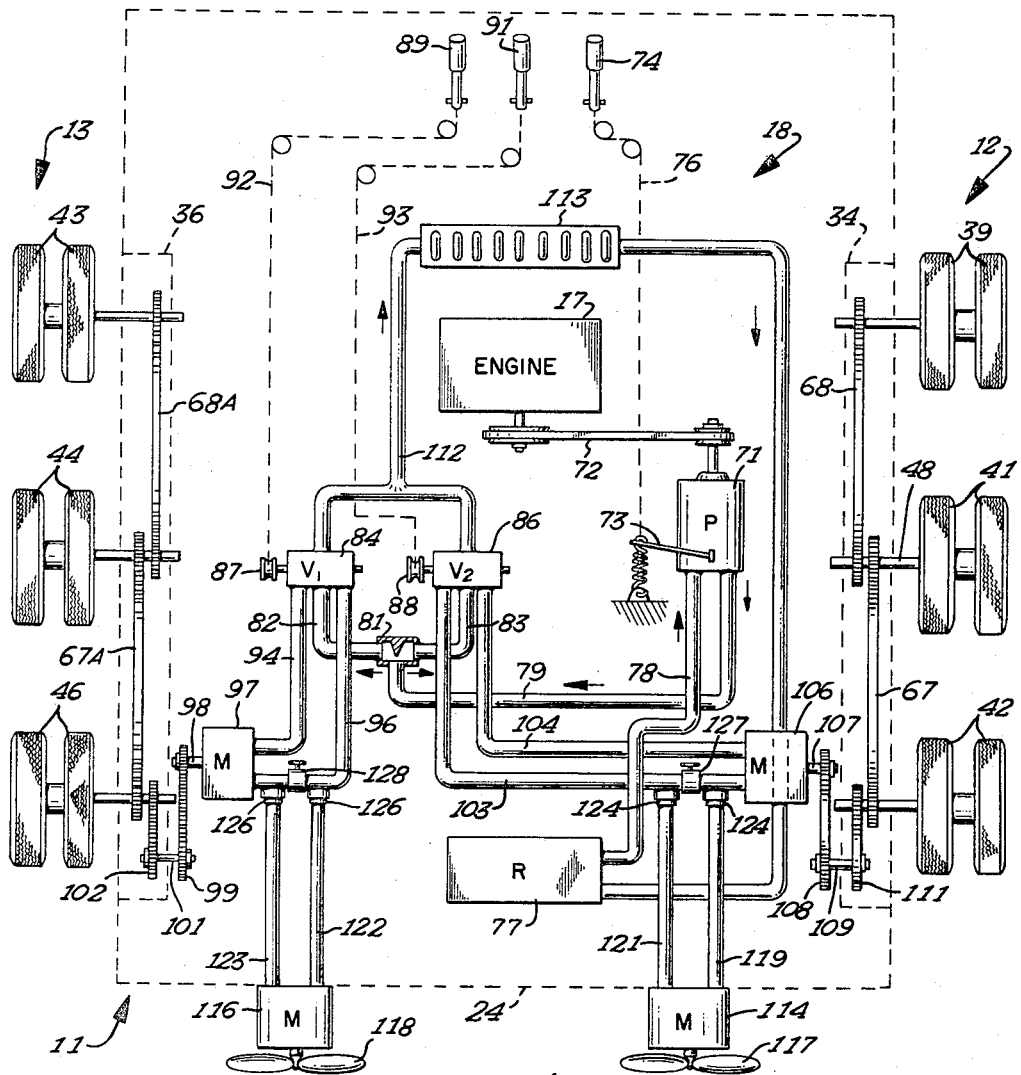
FIGURE 4 is a schematic diagram of the hydraulic drive system and mechanical power transmitting means of the drive system of this invention.

Referring to the drawing there is shown in FIGURE 1, a motor vehicle indicated generally at 10 having a body 11 supported by left and right drive wheels indicated generally at 12 and 13 rotatably mounted on opposite sides of the body. Tracks 14 and 16 trained about the opposite drive wheels 12 and 13 provide large ground engaging support areas enabling the vehicle to move over soft ground, marshes and the like. Centrally located in body 11 is an engine 17, as an air cooled internal combustion engine, which transmits power to a hydraulic drive system indicated generally at 18 in FIGURE 4. The hydraulic drive system transmits torque to the drive wheels 12 and 13 which in turn move tracks 14 and 16 propelling the vehicle over its supporting surface.

As shown in FIGURES 1 and 2, body 11 has spaced upright side walls 19 and 21 connected with a flat horizontal bottom wall 22. The front end of the body is closed with a forwardly and upwardly inclined front end wall 23. In a like manner the rear end of the body is closed with an upwardly and rearwardly inclined rear end wall 24 thereby providing the body with a rectangular box shape which can float in water. The top of walls 19, 21, 23 and 24 have an outwardly directed peripheral flange 26 providing a support for an upright rail 27. The lower portion of rail 27 has an inwardly directed flat base 28 secured to flange 26 by a plurality of nut and bolt assemblies 29. Rail 27 extends around the entire top of the body thereby increasing the carrying capacity of the body.

The forward portion of body 11 is covered with an upwardly and rearwardly projected hood 31 which is joined to an upright windshield 32. Located behind the windshield is a seat 33 for the operator of the vehicle.

As shown in FIGURE 2, a pair of longitudinal box beams 34 and 36 secured to bottom wall 22 extend longitudinally along opposite sides of the bottom wall. Beams 34 and 36 are rectangular in cross-section and longitudinal passages or chambers. Upwardly and inwardly inclined gusset plates 37 and 38 secured to the inner sides of beams 34 and 36 respectively and the bottom wall 22 function with the beams to reinforce body 11.

Shown in FIGURE 4, left and right drive wheels 12 and 13 comprise three right dual wheels 39, 41 and 42 and three left dual wheels 43, 44 and 46. Each dual wheel is secured to an axle 48 in a conventional manner. Each axle 48 is rotatably mounted on a box beam to rotatably support the dual wheels on the body. The support structure for each axle 48 is identical.

Drive wheel axle support for one of the axles 48 is illustrated in FIGURE 3. Axle 48 projects transversely through holes 57 and 58 in the sides of beam 34. Bearings 49 and 51 secured to opposite sides of beam 34 by nut and bolt assemblies 52 and 53 respectively rotatably support axle 48. Bearings 49 and 51 have inwardly directed shoulders 54 and 56 respectively which project through holes 57 and 58 in the sides of beam 34. Shoulders 54 and 56 are in bearing engagement with the portions of the beam forming the holes 57 and 58 thereby relieving the shear loads from the nut and bolt assemblies 52 and 53.

Drivably mounted on the center portion of axle 48 within the chamber of the box beam 34 are a pair of sprockets 59 and 61. The sprockets are splined or keyed to axles 48 so as to transmit torque to the axles. Spacer sleeves 62 and 63 located on opposite sides of sprockets 59 and 61 bear against bearings 49 and 51 to maintain the sprockets centrally in the beam 34. Holding members, as collars, 64 and 66 located adjacent opposite sides of bearings 49 and 51 and secured to axle 48 maintain the axle in assembled relation with the bearings.

As shown in FIGURE 4, each axle for the dual wheels extends through the adjacent box beam. The intermediate dual wheels 41 and 44 are connected with the rear dual wheels 42 and 46 by chain and sprocket drives 67 and 67A respectively. Similar chain and sprocket drives 68 and 68A connect the center or intermediate axle 48 with the forward axle secured to the forward dual wheels 39 and 43. Chain and sprocket drives 67 and 68 entirely located within the longitudinal passage of the box beam 34 transmit power to all three axles to simultaneously rotate wheels 39, 41 and 42. Chains and sprockets are lubricated with a lubricating fluid 69, as oil, located in the bottom of the chamber of beam 34. The chain and sprocket drives 67A and 68A are located in a similar manner in the longitudinal box beam 36. The box beams 34 and 36 in addition to reinforcement of the body support the axles 48 for all the drive wheels 12 and 13 and provide enclosed chambers for the power transmitting drives used to rotate the axles.

The hydraulic drive system 18, as shown in FIGURE 4, is operable to selectively transmit power to the opposite drive wheels 12 and 13 to propel the vehicle in forward and reverse directions as well as steer the vehicle. The hydraulic drive system 18 comprises a pump 71 connected to engine 17 with power transmitting means 72, as a plurality of belt and pulley drives or roller link chain. Pump 71 has a control member 73 operably connected to an upright lever 74 located in the cab of the vehicle. A cable 76 or similar power transmitting structure provides a direct connection between control member 73 and lever 74 so that on movement of lever 74 the amount of hydraulic fluid discharged by the pump can be changed thereby controlling the speed of the vehicle. Pump 71 is a variable volume hydraulic pump having a plurality of positive displacement pistons. Member 73 acts in conjunction with a cam (not shown) to vary the travel of the pistons thereby to either increase or decrease the flow and pressure of fluid moved by pump 71. By moving lever 74 the position of control member 73 is changed thereby altering the amount of fluid discharged by pump 71 so as to vary the speed of the vehicle.

Pump 71 withdraws liquid, as oil, from a reservoir 77 through an inlet line or conduit 78. The fluid is discharged by pump 71 under pressure through on outlet conduit 79 to a flow divider 81 which directs the stream of fluid into equal and opposite portions. Conduits 82 and 83 connected to divider 81 direct the fluid to separate control valves 84 ($V_1$) and 86 ($V_2$). Valves 84 and 86 are identical in construction and have valving members 87 and 88 selectively movable to neutral, forward and reverse positions to direct the fluid delivered to the valves to either fluid operated motors for driving the drive wheels 12 and 13 or back to the reservoir. The positions of the valving members are controlled by movement of a pair of levers 89 and 91 pivotally mounted on the vehicle adjacent lever 74. Separate cables 92 and 93 connect levers 89 and 91 to valving members 87 and 88 thereby enabling the operator of the vehicle to selectively move the valving members 87 and 88 to change the flow directions of the fluid to the drive motors.

Conduits or fluid lines 94 and 96 connected to valve 84 provide a fluid circuit for a fluid pressure operated motor 97 having a power output shaft 98. Link chain drive 99 couples output shaft 98 to a jack shaft 101 connected to the axle of the rear wheel 46 by a chain and sprocket drive 102. On operation of motor 97 in response to fluid under pressure chain drive 99, jack shaft 101 and chain and sprocket drive 102 transmits power to the axle of wheel 46. Link chains 67A and 68A carry the power forward to intermediate wheels 44 and forward wheel 43.

Conduits or lines 103 and 104 couple valve 86 to a fluid pressure operated motor 106 having a drive shaft 107. Power is transmitted to the axle of rear wheel 42 through a link chain 108 coupled to drive shaft 107 and to a jack shaft 109. From the jack shaft 109 link and sprocket drive 111 transmits power to the rear axle. Link chains 67 and 68 carry the power forward from the rear axle to the intermediate axle 48 and the forward axle 39 thereby simultaneously driving all the wheels 12.

From control valves 84 and 86 the hydraulic circuit is completed through a return conduit 112 which connects the valves to reservoir 77. Interposed in return conduit 112 is a radiator 113 which functions to cool the hydraulic fluid in the event the fluid has been heated by the pump or hydraulic motors.

Motors 97 and 106 have positive displacement pistons which move in response to hydraulic pressure to drive their respective drive shafts 98 and 107. Motors 97 and 106 may be any suitable hydraulic motors that can develop sufficient torque and speed to efficiently drive wheels 12 and 13.

Auxiliary motors 114 and 116 releasably mounted on rear end wall 24 of the body are used to propel the vehicle in water. Motors 114 and 116 have drive shafts carrying propellers 117 and 118 used to propel and steer the vehicle in water. Hoses 119 and 121 couple motors 114 with line 103. Hoses 122 and 123 couple motor 116 with line 96. Interposed in line 103 are releasable couplings 124 having check valves used to attach the ends of hoses 119 and 121 to line 103. In a similar manner releasable couplings 126 connect the ends of hoses 122 and 123 to line 96. Positioned between in line 103 between couplings 124 is a valve 127 which can block the flow of fluid in line 103 thereby direct the fluid through propeller motor 114. A similar valve 128 is located in line 96 between couplings 126. Valves 127 and 128 are manually turned to "on" and "off" positions. They may be remotely controlled from the instrument panel of the vehicle. The flow of fluid in lines 96 and 103 can be controlled by changing the positions of the valving members 87 and 88 thereby controlling rotation of the propellers.

As shown in FIGURE 1, motor 114 is mounted on a bracket 129 secured to the end wall 24. A similar bracket is used to mount motor 116 on the end wall.

Figure 6:
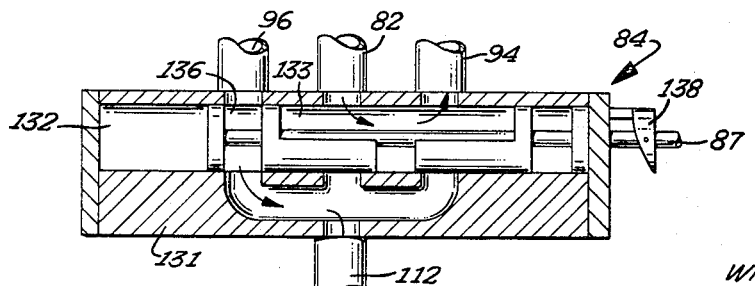
FIGURE 6 is a view similar to FIGURE 5 showing the valving member in the forward flow position.
Figure 7:
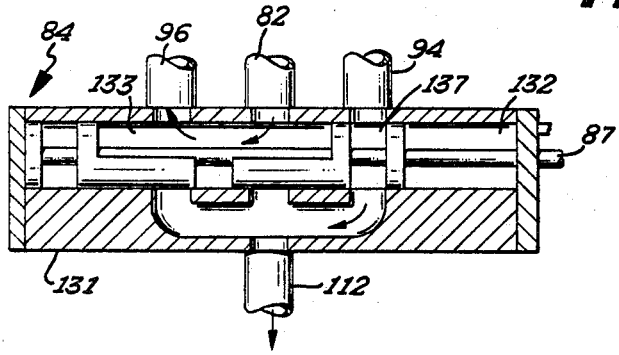
FIGURE 7 is a view similar to FIGURE 5 showing the valving member in the reverse flow position.

Referring to FIGURES 5, 6 and 7, control valve 84 is shown in section with valving member 87 in neutral, forward and reverse positions. Since control valve 86 is identical in structure and operation with valve 84 the following description is limited to valve 84. Control valve 84 has a housing 131 containing an axial bore 132 slidably accommodating valving member 87. The portion of valving member 87 in bore 132 is a spool valve having a longitudinal passage 133 in communication with a central opening 134. As shown in FIGURE 5, when valving member 87 is in the neutral position longitudinal passage 133 is in fluid communication with the inlet conduit 82 and motor conduits 94 and 96. The opening 134 is in alignment with inlet conduit 82 and the return or reservoir conduit 121 whereby fluid delivered to the valve moves directly through the valve into reservoir conduit 112. The fluid in motor lines 94 and 96 is free to move into and out of the motor as shown by the full and broken arrows. With line 82 and motor lines 94 and 96 in direct communication with return line 112 the fluid in motor lines is at a relatively low pressure. This causes the motor to operate freely preventing hydraulic braking of the motor when valving member is in the neutral position. The vehicle can be steered by moving one valving member to the neutral position thereby terminating the power output of the motor coupled with the valving member. This motor does not inhibit continued turning of the drive wheels or track because hydraulic fluid is not trapped in the motor.

Located adjacent opposite ends and spaced from the longitudinal passage 133 are transverse passages 136 and 137 which selectively communicate motor lines 96 and 94 to reservoir conduit 112. As shown in FIGURE 6, valving element 87 is moved to the right whereby longitudinal passage 133 provides direct communication between inlet conduit 82 and motor line 94 to supply the motor 97 with fluid under pressure. The fluid circuit for motor 97 is completed by motor line 96 aligned with the transverse passage 136. The fluid flows from motor 97 through line 96, passage 136 in valve 84 and into reservoir conduit 112.

As shown in FIGURE 7, valving member 87 has been moved to the left placing longitudinal passage 133 in communication with inlet conduit 82 and motor line 96. Transverse passage 137 is in a line with motor line 94 whereby fluid is directed through the motor in an opposite direction. From the motor the fluid flows through motor line 94, transverse passage 137 into the return conduit 112.

As shown in FIGURE 6, a cam 138 secured to the projected end of valving member 87 is used to shift the valving member to its selected positions. Any suitable structure may be used to shift the valving member relative to the housing 131. Valves 84 and 86 may be any valves which allow substantial free flow of fluid through the drive motors when fluid under pressure is not directed to the motors. For example, the valves may have a direct fluid loop to the motors when in a neutral position.

In use, on operation of internal combustion engine 17 power is transmitted to pump 71 which withdraws fluid from reservoir 77 and discharges the fluid under pressure through outlet conduit 79 to flow divider 81. From the flow divider the fluid flows in generally equal amounts through conduits 82 and 83 into control valves 84 and 86. The valving members 87 and 88 of the respective control valves may be selectively moved to control the direction of the flow of fluid to drive motors 97 and 106 and to terminate the flow of fluid to the drive motors. To turn the vehicle one of the valves, for example, valve 86, is moved to the neutral position thereby terminating the flow of fluid to motor 106. Under these conditions valve 84 directs fluid under pressure to motor 97 thereby driving the wheels 13. With wheels 12 free to rotate the vehicle will gradually turn to the right because of frictional resistance forces of the drive for the wheels. To increase the turning circle of the vehicle valving member 88 may be moved to the reverse position whereby wheels 12 are driven in a reverse direction. At the same time wheels 13 are driven in the forward direction with the result that the vehicle turns substantially about the upright central axis of the body.

Under forward or reverse conditions the speeds of the vehicle may be varied by moving lever 74 which in turn changes the position of the pump control member 73 whereby the pump 71 delivers varying amounts of hydraulic fluid under pressure. A change in the rate of flow of fluid delivered to the drive motors changes the speed of rotation of the motor drive shafts.

To propel the vehicle in water valves 127 and 128 are closed blocking the flow of fluid in conduits 103 and 96 thereby placing propeller motors 114 and 116 in series with drive motors 106 and 97. Propellers 117 and 118 are rotated on application of fluid under pressure to the motors 114 and 116. The vehicle can be steered in water by differentially varying the flow rates of fluid supplied to motors 114 and 116. The propeller drive may be readily disconnected from the hydraulic drive system by uncoupling the releasable couplings 124 and 126.

Figure 8:
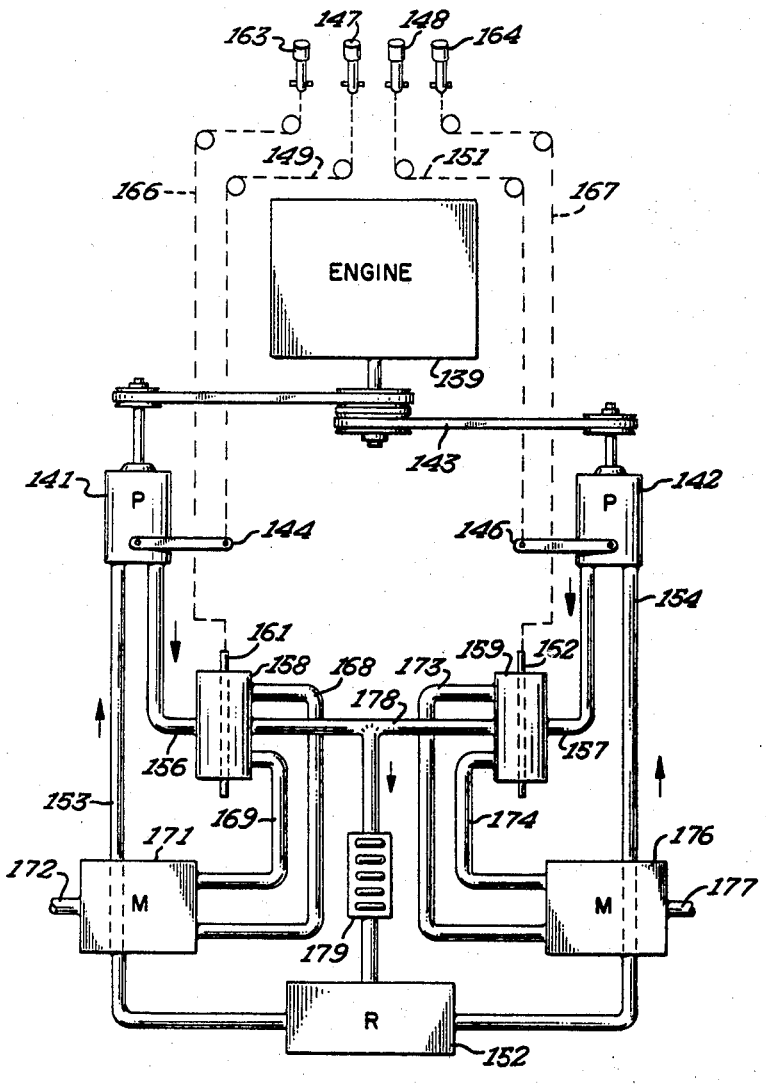
FIGURE 8 is a schematic diagram of a modified hydraulic system having a pair of pumps.

Referring to FIGURE 8, there is shown a modified hydraulic drive system for transmitting power to the opposite wheels 12 and 13. The drive system obtains power from an internal combustion engine 139 coupled to a pair of pumps 141 and 142 by common power transmitting means 143, as a plurality of belts and pulleys, chains and sprockets and the like. Pumps 141 and 142 are positive displacement piston pumps similar to the pump 71 having control members 144 and 146 which can be selectively moved to vary the displacement of the pump pistons and thereby either increase or decrease the rate of flow of fluid from the pumps. Control member 144 is connected to a lever 147 through cable 149. In a similar manner, control member 146 is connected to lever 148 by a cable 151. Movement of the levers 147 and 148 selectively control the output flow of fluid from the pumps.

On operation of engine 139, pumps 141 and 142 draw fluid from reservoir 152 through inlet lines 153 and 154 and discharge fluid under pressure to outlet lines 156 and 157 connected to control valves 158 and 159. The control valves 158 and 159 have movable valving members 161 and 162 respectively which are attached to separate levers 163 and 164 by means of cables 166 and 167. The levers 163 and 164 are movable to change the positions of the valving members from neutral positions, forward positions and reverse positions. Control valves 158 and 159 are identical in operation with the valves 84 and 86 shown in FIGURE 4. These valves have valving members which when in the neutral position cannot block or lock the fluid in the lines connecting the valves to the drive motor thereby allowing the free rotation of the drive motors when fluid under pressure is not supplied to the drive motors.

Valve member 158 is connected by a pair of lines 168 and 169 to a hydraulic drive motor 171 having a drive shaft 172. The drive shaft may be connected to the chain and sprocket drive of the vehicle in a manner similar to the chain and drive sprocket shown in FIGURE 4. A pair of lines 173 and 174 connect the valve 159 to hydraulic drive motor 176 having a drive shaft 177. Suitable chain and sprocket drives may be used to connect the drive shaft 177 to the drive wheels of the vehicle. Drive motors 171 and 176 have positive displacement pistons similar to the pistons in pumps 141 and 142 to insure the transmission of large torques to the drive shafts 172 and 177.

The hydraulic circuit is completed from valves 158 and 159 through a return line 178 connecting the valves to reservoir 152. Interposed in the return line 178 is a radiator 179 used to cool the fluid.

With the hydraulic drive system as shown in FIGURE 8 the vehicle may be turned by changing the relative hydraulic fluid outputs of pumps 141 and 142 thereby changing the relative speeds of rotation of the drive shafts of the motors 171 and 176. The speed of the vehicle may be changed by varying the output of both pumps 141 and 142 to either increase or decrease the speed of rotation of the drive shafts 172 and 177. In order to make a sharp turn, one of the control valves 158 or 159 is actuated by movement of one of the levers 147 or 148 thereby moving one valving member to the reverse position reversing the flow of fluid to the drive motor. This will reverse the direction of movement of drive wheels whereby the drive wheels on one side of the vehicle move in a forward direction and the drive wheels on the opposite side move in a reverse direction.

While there has been shown and described a motor vehicle and hydraulic drive system of this invention with respect to preferred embodiments, it is to be understood that various changes, additions and modifications may be made by those skilled in the art without departing from the spirit and scope of the invention. For example, control valves 84, 86, 158 and 159 may vary in structure and still provide the free flow of fluid to and from the drive motors when the valves are in the neutral position. In addition, the drive motors 97, 106, 171 and 176 may vary in size according to the torque and speed required to propel the vehicle.

The embodiments of the invention in which an exclusive property or privilege is claimed are defined as follows:

1. A drive system for a vehicle having an engine, first drive wheel means on one side of the vehicle and second drive wheel means on the opposite side of the vehicle comprising: reservoir means for storing fluid, pump means drivably connected to said engine and connected in fluid communication with the reservoir means, said pump means operable by the engine to withdraw fluid from said reservoir means and discharge a supply of fluid under pressure, first single motor means drivably connected to the first drive wheel means, second single motor means drivably connected to the second drive wheel means, first conduit means for directing the supply of fluid pressure to the first motor means, second conduit means for directing the supply of fluid to the second motor means, a single first valve connected in the first conduit, a single second valve connected in the second conduit, fluid return conduit means connecting each motor means to the valve associated with each motor means, conduit means connecting each valve with the reservoir means to carry fluid from the valve directly into the reservoir means, each valve having a valving member selectively movable to a neutral position wherein fluid flows through the valve directly back to the reservoir without trapping fluid in the conduit means coupling the valves with the motor means, to a forward position to direct fluid under pressure to the motor means and to a reverse position to reverse the direction of flow of fluid to said motor means.

2. The drive system of claim 1 wherein said pump means includes a control movable to vary the amount of fluid discharged by the pump means.

3. The drive system of claim 1 wherein said pump means has positive displacement pistons and a control movable to vary the displacement of said pistons to vary the amount of fluid discharged by the pump means.

4. The drive system of claim 1 wherein said pump means comprises a first pump and a second pump, power transmitting means drivably coupling both pumps to the engine, said first conduit means coupling the first pump to the first valve and said second conduit means coupling the second pump to the second valve.

5. The drive system of claim 4 wherein each pump has a control movable to vary the amount of fluid discharged by said each pump.

6. The drive system of claim 4 wherein said first pump and said second pump each have positive displacement pistons and controls independently movable to vary the displacement of said pistons to vary the amount of fluid discharged by each pump.

7. The drive system of claim 1 including radiator means interposed in said conduit means connecting each valve with the reservoir for cooling the fluid.

8. The drive system of claim 1 including additional motor means drivably connected to propellers for moving the vehicle in water and conduit means coupling the additional motor means to conduit means directing the supply of fluid pressure to the motor means connected to the drive wheel means.

9. The drive system of claim 1 including a pair of longitudinal beam means, axle means rotatably mounted on each beam means and projected outwardly therefrom, said first and second drive wheel means each secured to separate axle means with the first drive wheel means located on one side of the vehicle and the second drive wheel means located on the other side of the vehicle and power transmitting means drivably coupling the axle means rotatably mounted on one beam to the first motor means and the axle means rotatably mounted on the other beam to the second motor means.

10. The drive system of claim 9 wherein said beam means are box beams having longitudinal passages, said power transmitting beams being located with said passages.

11. The drive system of claim 1 including a pair of longitudinal beam means secured to the bottom of the vehicle body, a plurality of transverse axle means rotatably mounted on each beam means and projected outwardly therefrom, said first drive wheel means comprising separate wheels secured to separate axle means projected from one beam means, said second drive wheel means comprising separate wheels secured to separate axle means projected from the other beam means, first power transmitting means drivably coupling all the axle means on said one beam means with the first motor means, and second power transmitting means drivably coupling all the axle means on said other beam means with the second motor means.

12. The drive system of claim 11 wherein said beam means are box beams having longitudinal passages, said first power transmitting means being located in the passage of said one beam means and said second power transmitting means being located in the passage of said other beam means.

13. A wheel support and power transmitting means for a vehicle having drive wheel means rotatable by motor means comprising: a body having a generally horizontal bottom wall, a pair of beams having longitudinal passages extended in a longitudinal direction secured to opposite side portions of the bottom wall, axle means projected transversely through said passages and attached to said drive wheel means located on opposite sides of the vehicle, bearing means rotatably mounting the axle means on said beams, and the power transmitting means located within said passages drivably coupling the axle means with the motor means.

14. The structure of claim 13 wherein said power transmitting means comprise sprockets mounted on the axle means and chains trained about the sprockets.

15. The structure of claim 13 wherein a plurality of longitudinally spaced axle means project transversely through the longitudinal passages of the beams, each of said axle means attached to drive wheel means.

References Cited

UNITED STATES PATENTS

| | | | |
|---|---|---|---|
| 2,486,049 | 10/1949 | Miller | 115—34 |
| 3,161,172 | 12/1964 | Kassbohrer | 115—1 |
| 3,161,246 | 12/1964 | Meeker et al. | 115—1 X |
| 3,188,996 | 6/1965 | Thompson | 115—1 |

ANDREW H. FARRELL, *Primary Examiner.*